United States Patent [19]

Johnston

[11] Patent Number: 4,658,489

[45] Date of Patent: Apr. 21, 1987

[54] CLIP REMOVING TOOL

[75] Inventor: Harry R. Johnston, Coatesville, Pa.

[73] Assignee: Mega Enterprises, Inc., Coatesville, Pa.

[21] Appl. No.: 851,496

[22] Filed: Apr. 14, 1986

[51] Int. Cl.4 .............................................. B23P 19/04

[52] U.S. Cl. ........................................ 29/268; 81/302; 81/485

[58] Field of Search .................... 81/485, 302; 29/268, 29/239

[56] References Cited

U.S. PATENT DOCUMENTS

| | | | |
|---|---|---|---|
| 326,909 | 9/1885 | Kricker . | |
| 478,009 | 6/1892 | Hollis . | |
| 717,526 | 1/1903 | Barney . | |
| 1,019,605 | 3/1912 | Cummings . | |
| 2,342,479 | 2/1944 | Miles et al. . | |
| 2,570,881 | 10/1951 | Stewart | 81/3.46 |
| 3,233,313 | 2/1966 | Roth | 29/235 |
| 3,357,085 | 12/1967 | Martin | 29/268 |
| 3,715,794 | 2/1973 | McCollum et al. | 29/235 |
| 4,240,190 | 12/1980 | Bray | 29/268 |

*Primary Examiner*—Roscoe V. Parker

*Attorney, Agent, or Firm*—Howson and Howson

[57] ABSTRACT

A tool specifically designed for use in removing headed clips having threaded shanks used to fasten panels. The tool includes a pair of pivotally connected members having thin, elongate proximal jaw portions adapted to be inserted between the clip head and underlying structure and having distal handle portions for separating the jaw portions to pull on the clip. Preferably, the handles are spring biased apart, and the proximal jaw portions have specially shaped recesses and surfaces enabling them to be disposed in coplanar relation to permit desirable forces to be applied to the clip when the handles are squeezed together.

7 Claims, 3 Drawing Figures

FIG. 1
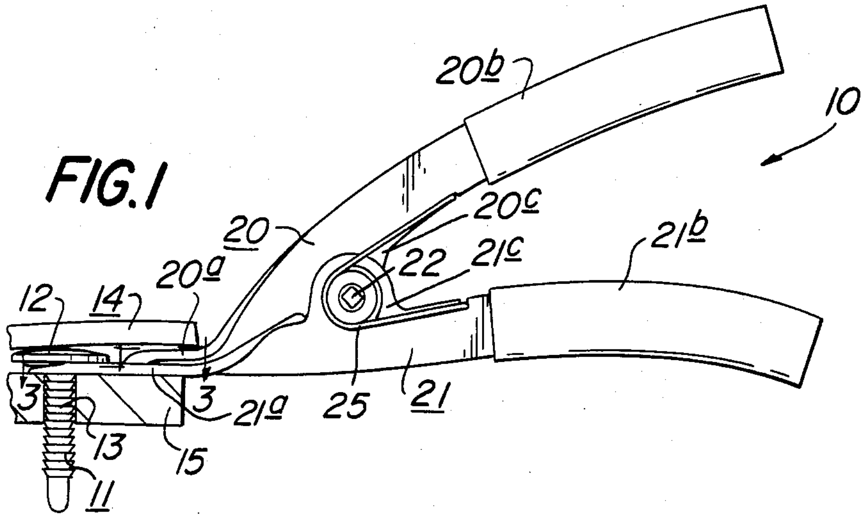
FIG. 2
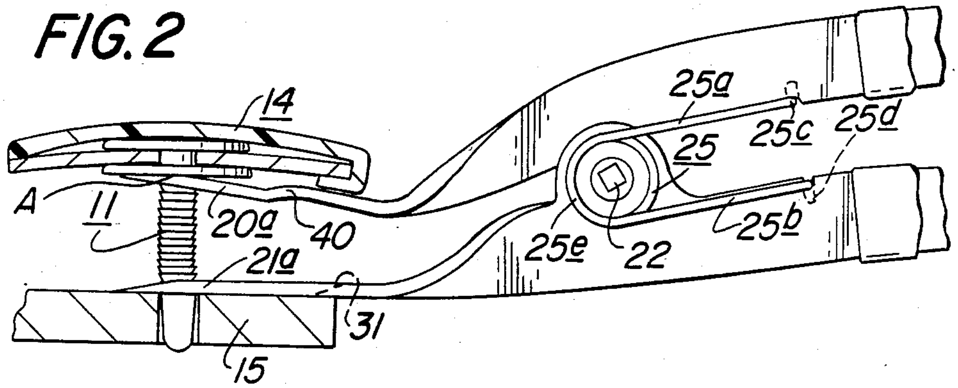
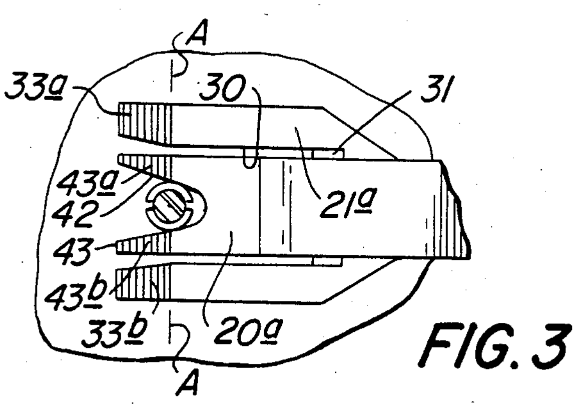
FIG. 3

CLIP REMOVING TOOL

FIELD OF THE INVENTION

The present invention relates to hand tools, and more particularly, the present invention relates to prying-type hand tools of the type used to remove headed fasteners.

BACKGROUND OF THE INVENTION

In modern automobiles, decorative interior panels, insulation, and the like are often secured by clips, or fasteners, having relatively large heads and serrated shanks connecting the panel to an underlying frame member. Such clips are normally fabricated of plastic and are usually simply pressed into position during assembly. If removed carefully, such as when repair work is to be performed, such clips can be reused.

At present, a one-piece prying-type tool is commercially available for removing clips. The tool has a V-shaped proximal portion with a distal handle. The proximal portion is slid between the head of the clip and the underlying structure, and the handle is tilted away from the underlying structure to tension the clip and pull it out of its receiving hole.

A disadvantage of this tool is that there is a tendency for the clip to bend during removal and for the head to break off. Not only does this make removal of the clip more difficult, but the clip cannot be reused. It must be replaced by a new clip to complete the repair job. In addition, such tool can damage an underlying panel.

Accordingly, a simple tool which enables such clips, and panels connected thereto, to be removed quickly and without damage either to the clip or panel is highly desirable.

BRIEF DESCRIPTION OF THE PRIOR ART

U.S. Pat. No. 326,909 discloses a prying-type box opener having wedge-shaped movable jaws connected to handles.

U.S. Pat. No. 478,009 discloses a pliers-type prying tool designed to remove clock handles.

U.S. Pat. No. 717,526 discloses a pliers-type prying tool designed to remove valve handles.

U.S. Pat. No. 2,342,479 discloses a pliers-type prying tool. See FIGS. 6–8.

U.S. Pat. Nos. 1,019,605; 2,570,881; 3,233,313; 3,715,794; and 4,240,190 disclose various other types of special purpose prying tools.

OBJECTS OF THE INVENTION

With the foregoing in mind, a primary object of the present invention is to provide a novel hand tool which enables clips to be removed quickly without breaking.

Another object of the present invention is to provide a unique clip removing tool which is rugged and relatively inexpensive to manufacture.

A further object of the present invention is to provide an improved clip removing tool which enables desirable forces to be applied to a clip during removal to thereby minimize a tendency for the clip to break during withdrawal.

As a still further object, the present invention provides a clip removing tool having an elongate thin jaw profile enabling it to remove clips located inwardly substantial distances from the edges of panels.

SUMMARY OF THE INVENTION

More specifically, the present invention provides a hand tool which utilizes a pliers-type prying-type action to remove headed clips. The tool comprises a pair of pivotally connected members having thin, elongate separable jaws arranged in coplanar relation for insertion underneath the head of the clip. One of the jaws has a shaped recess for receiving the shank of the clip, and the other jaw has a recess for receiving the shank receiving jaw. The tool has a pair of handles which extend distally from the jaws and which are spring biased apart. The jaws are provided with surfaces located in such a manner as to facilitate insertion and to enable the upper jaw to rock about the clip head as the jaws pivot to thereby apply desirable forces to the clip during removal.

BRIEF DESCRIPTION OF THE DRAWINGS

The foregoing and other objects, features and advantages of the present invention should become apparent from the following description when taken in conjunction with the accompanying drawing, in which:

FIG. 1 is a side elevational view of a clip removing tool embodying the present invention;

FIG. 2 is an enlarged, fragmentary side elevational view of the clip illustrated in FIG. 1 shown in the process of removing a captive clip; and FIG. 3 is an enlarged fragmentary plan view taken on line 3—3 of FIG. 1.

DESCRIPTION OF THE PREFERRED EMBODIMENT

Referring now to the drawings, FIG. 1 illustrates a clip removing tool 10 which embodies the present invention. The tool 10 is particularly suited for use in removing clips, or fasteners, such as the clip 11 used to fasten a decorative panel 14 to an underlying frame structure 15, such as an automobile frame having a hole for receiving and anchoring the shank 13 of the clip 11. In the illustrated embodiment, the clip 11 has a slotted head 12 and is held captive to the panel 14; however, the tool 10 of the present invention can be used with other types of headed fasteners, such as used to secure insulation beneath the hood of an automobile. As noted above, heretofore it has been difficult to remove such clips quickly and easily without damaging either the clip or the panel in the course of clip removal.

In accordance with the present invention, the tool 10 is designed to be inserted easily between a panel and its securing structure, or between the head of a clip and its underlying panel, and to apply substantially uniform pressure in opposite directions therebetween for axially tensioning the clip 11 and thus minimizing the tendency for the clip 11 to break during removal. To this end, as best seen in FIG. 1, the tool 10 comprises an upper member 20 and a lower member 21 pivotally fastened together by a rivet, or bolt, 22 permitting the members to pivot relative to one another about a horizontal axis. The lower member 21 has a thin elongate proximal jaw portion **21*a* and a distal handle portion 21*b* formed integral therewith. The upper member 20 has a thin elongate proximal jaw portion 20*a* and a distal handle portion 20*b* formed integral therewith. The rivet providing the pivot 22 extends through a flange 20*c* depending from the upper member 20 and disposed alongside a flange 21*c* projecting upwardly from the lower member 21. The handle 21*b* of the lower member 21** curves upwardly above the plane of the proximal portion 21*a* thereof to provide a space for accommodating a person's fingers when gripping the tool 10 and sliding it along an underlying panel surface (not shown).

The proximal jaw portions 20*a* and 21*a* are specially shaped to be inserted readily between the head 12 of the clip 11 and its anchoring structure 15 for effecting the aforedescribed pressure distribution and axial tension on the clip 11 during clip removal. To this end, as best seen in FIGS. 2 and 3, the proximal portions 20*a* and 21*a* of the upper and lower members 20 and 21, respectively have a relatively large working surface area and are bent into a plane orthogonal to the plane of the handle portions 20*b* and 21*b* respectively thereof, so that the handle portions are thus disposed in a substantially vertical plane to provide flexural resistance when squeezed while the jaw portions are disposed in a substantially horizontal plane. As best seen in FIG. 3, the lower jaw portion 21*a* has a frontward opening rectangular recess 30 and an upwardly and rearwardly inclined surface 31 (FIG. 2) at the rear end of the recess 30 for accommodating a downwardly offset portion 40 of the upper member jaw portion 20*a*. The downwardly offset portion 40 of the upper member jaw portion 20*a* engages the inclined surface 31 of the lower member jaw portion 21*a* and disposes the jaw portions 20*a*, 21*a* in coplanar relation such as illustrated in FIGS. 1 and 3. The jaw portions 20*a*, 21*a* overlap in substantially parallel relation between their coplanar portions and their pivot axis 22.

Preferably, the handles 20*b* and 21*b* are biased apart to maintain the jaw portions 20*a*, 21*a* in coplanar relation. To this end, a torsion spring 25 is carried alongside the members 20, 21 and engages the handles 20*b* and 21*b* thereof. As best seen in FIG. 2, the torsion spring 25 has arms 25*a* and 25*b* of equal length with bent ends 25*c*, 25*d* received in notches in the handles 20*b* and 21*b*, respectively. The coil portion 25*e* of the torsion spring 25 is substantially centered on the pivot axis of the connecting rivet 22. This structure biases the handles 20*b* and 21*b* apart yet is easy to assemble since the spring 25 can simply be snapped in place and does not require any separate retainer to prevent it from disengaging the handles in use. Thus, the biasing torque provided by the torsion spring 25 causes the front portions of the jaws 20*a*, 21*a*, normally to be disposed in the aforementioned desirable coplanar relation during initial insertion of the tool 10.

To facilitate sliding engagement of the jaws between the head 12 of the clip 11 and the underlying structure 15, the jaw portions 20*a*, 20*b* are relatively thin, on the order of about ⅛ inch thick, and have smooth opposite parallel surfaces each with a working surface area of substantial size. The upper member jaw portion 20*a* has a front opening substantially V-shaped recess 42 adapted to receive the shank 13 of the clip 11, such as in the manner illustrated in FIG. 3. The top surface of the upper member jaw portion 20*a* is provided with a pair of chamfered surfaces 43*a*, 43*b* which extend rearwardly from the front edge 43 thereof to a location corresponding to about one-half the depth of the substantially V-shaped notch 42 measured in the direction of tool insertion. In addition, the front of the lower member jaw portion 21*a* has a like pair of chamfered surfaces 33*a*, 33*b* extending to a similar depth. See FIG. 3. The chamfered surfaces merge with the top surfaces of their respective jaw portions to provide a transverse fulcrum extending along a line A. When the tool 10 is used with a clip 11 of about the size illustrated, the fulcrum A passes through about the center of the shank 13 of the clip 11 and diametrically along the underside of the clip head 12, such as illustrated in FIGS. 2 and 3.

In use, the tool 10 is gripped by its handles 20*b*, 21*b* and its jaws 21*a*, 21*b* are slid into position between the underside of the head 12 of the clip 11 and the underlying clip anchoring structure 15. This sliding motion is facilitated by virtue of the thin elongate jaw portions and their chamfered upper forward surfaces. The jaws 21*a*, 21*b* are advanced toward a clip shank 13 to approximately the depth indicated in FIG. 1, whereupon the underside of the clip head 12 is located rearwardly of the fulcrum A.

The handles 20*b* and 21*b* are then squeezed. As the handles move toward one another, the upper jaw portion 20*a* moves upwardly relative to the lower jaw portion 21*a*. This causes the lower jaw portion 21*a* to apply downward pressure to the structure 15 and upward pressure to the head 12 of the clip 11. This pressure in opposite directions tensions the clip shank 13 and displaces the clip 11 upwardly.

As the handles 20*b* and 21*b* move closer together, such as into the position illustrated in FIG. 2, the jaw portions 20*a*, 21*a* pivot through an angle, and the point of engagement of the underside of the clip head 12 and the jaw portion 20*a* of the upper tool shifts forwardly of the fulcrum A. As a result, a sort of rocking action is provided about the fulcrum A, and this action causes the pulling pressure to be shifted relative to the clip head 12. Thus substantially axial tension is maintained on the clip shank 13 at all times during removal while a satisfactory distribution of pressure is maintained against the head of the clip 11. As a result of this rocking action and pressure distribution, there is little tendency for either the head 12, or the shank 13, of the clip 11 to bend during clip removal, and this results in fewer clips being broken. In addition, the working surface area of the lower jaw portion is such that it distributes pressure to the underlying surface and thereby prevents it from being damaged.

By way of example, and not by way of limitation, the tool is preferably fabricated of Type 1070 spring steel and is annealed to a hardness of 46–50 Rockwell C. The members are preferably each about ⅛ inch thick, so that even in the zone where they overlap adjacent to their pivot axes, the combined thickness is little more than about ¼ inch. Moreover, the length of the zone of coplanarity of the jaw portions is at least about one inch measured distally from the front edges of the jaw members, and the overall area of the jaw portions is slightly greater than about 1.5 square inches. These dimensional relations insure that the jaw portions have a thin profile of a substantially constant thickness for a substantial distance. This enables the tool to be inserted to substantial depths from the edge of a panel to engage clip shanks spaced inwardly therefrom. Also, the use of annealed spring steel ensures the desired level of strength and stiffness of the tools during pressure application.

In view of the foregoing, it should be apparent that the present invention now provides an improved clip removing tool which enables clips to be removed positively and easily with minimal clip breakage yet is rugged, inexpensive to manufacture, and easy to use.

While a preferred embodiment of the present invention has been described in detail, various modifications, alterations and changes may be made without departing from the spirit and scope of the present invention as defined in the appended claims.

I claim:

1. For use in removing a clip having a head and a depending shank anchored below a surface, a prying tool comprising: a lower member having a planar jaw portion adapted to be positioned above said surface and having an integral handle portion extending distally therefrom, an upper member having a planar jaw portion adapted to engage below the head of said clip and having an integral handle portion extending distally therefrom in spaced relation with said lower member handle, means pivotally connecting said upper and lower members for causing said jaw portions to move apart when said handle portions are squeezed together, said jaw portion of said upper member having a front opening recess adapted to receive the shank of the clip, said jaw portion of said lower member having a front opening recess for receiving in coplanar relation the jaw portion of said upper member, said jaw portions of said members having chamfered upper surfaces at their proximal ends to facilitate their insertion underneath the head of the clip, said jaw portions of said members being thin and elongate and extending in coplanar relation for a first portion of their lengths and in closely spaced overlapping relation for a second portion of their lengths to provide a thin jaw profile enabling the jaws to be inserted to a predetermined depth inwardly of the edge of a panel, whereby the clip can be pried loose by inserting the jaw portions of the members between its head and underlying surface and squeezing the handles together.

2. The tool according to claim 1 wherein said jaw portions have smooth flat opposite surfaces extending in parallel relation for said first portion of their lengths, said first portion corresponds to a distance of at least about one inch measured distally from the front edges of the jaw members, and said jaw portions have a thickness between said surfaces of about $\frac{1}{8}$ inch for at least said distance.

3. The tool according to claim 1 wherein said pivotal connecting means includes an upstanding integral flange on said lower member and a depending integral flange on said upper member, said flanges being disposed alongside one another and interconnected for providing a pivot axis, said jaw portions being bent into a plane orthogonal to the plane of their respective handle portions at a location forward of said pivot axis.

4. The tool according to claim 1 wherein the jaw portions of said members have engageable surfaces adjacent the rear ends of the jaw portion recesses for disposing said jaw portions in said coplanar relation when said handles are spread apart.

5. The tool according to claim 1 including angularly disposed surface means located on said upper jaw member and intersecting to form a transverse fulcrum for permitting pivoting of said upper jaw member relative to the underside of the clip head.

6. The tool according to claim 1 including means for biasing said handle portions away from one another to separate said handles and to dispose said jaw portions of said members in said coplanar relation.

7. The tool according to claim 1 including a torsion spring having a coil disposed alongside said members with its center located substantially concentric with the pivot axis of said pivotal connecting means and having a pair of arms extending distally therefrom and hooked into confronting notches in said handle portions distally of said pivot axis.

* * * * *